US008848586B2

(12) United States Patent
Liu et al.

(10) Patent No.: US 8,848,586 B2
(45) Date of Patent: Sep. 30, 2014

(54) ELECTRONIC DEVICE WITH NETWORK CONNECTION FUNCTIONALITY AND METHOD APPLIED TO THE ELECTRONIC DEVICE

(75) Inventors: Chun-Hung Liu, New Taipei (TW); Liang-Wei Huang, Hsinchu (TW); Ming-Feng Hsu, Taipei (TW); Hsiao-Ming Huang, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 284 days.

(21) Appl. No.: 13/228,470

(22) Filed: Sep. 9, 2011

(65) Prior Publication Data

US 2012/0063468 A1    Mar. 15, 2012

(30) Foreign Application Priority Data

Sep. 9, 2010    (TW) .............................. 99130474 A

(51) Int. Cl.
*H04L 12/28*    (2006.01)
*H04L 12/40*    (2006.01)

(52) U.S. Cl.
CPC ........... *H04L 12/40039* (2013.01); *Y02B 60/35* (2013.01); *H04L 12/40032* (2013.01); *Y02B 60/32* (2013.01)
USPC ............................. 370/311; 370/419; 709/250

(58) Field of Classification Search
None
See application file for complete search history.

(56) References Cited

U.S. PATENT DOCUMENTS

| 6,236,650 B1* | 5/2001 | Le Dantec et al. ............. 370/346 |
| 6,795,450 B1 | 9/2004 | Mills |
| 7,804,859 B2 | 9/2010 | Landry et al. |
| 8,023,444 B2 | 9/2011 | Bowser et al. |
| 8,055,827 B2 | 11/2011 | Serebrin et al. |
| 8,208,387 B2 | 6/2012 | Stueve |
| 8,565,269 B2 | 10/2013 | Diab |
| 2002/0162038 A1* | 10/2002 | Bullman et al. .............. 713/323 |
| 2008/0170586 A1* | 7/2008 | Huff et al. ...................... 370/463 |
| 2009/0059948 A1* | 3/2009 | Stueve .......................... 370/445 |
| 2009/0257457 A1* | 10/2009 | Diab ............................ 370/503 |
| 2009/0323717 A1* | 12/2009 | Landry et al. ................. 370/463 |
| 2010/0002610 A1* | 1/2010 | Bowser et al. ................ 370/311 |
| 2010/0191885 A1* | 7/2010 | Serebrin et al. ............... 710/260 |

* cited by examiner

*Primary Examiner* — Christine Duong
(74) *Attorney, Agent, or Firm* — McClure, Qualey & Rodack, LLP

(57) ABSTRACT

An electronic device with network connection functionality includes a transceiver chip and a processing circuit. The transceiver chip is utilized for processing a data corresponding to a physical (PHY) layer. The processing circuit is externally connected to the transceiver chip, for processing a data corresponding to a media access control (MAC) layer. When the transceiver chip receives a designated packet, the transceiver chip generates a notification signal to notify at least one portion of the processing circuit to be switched from a first operating mode to a second operating mode.

19 Claims, 10 Drawing Sheets

US 8,848,586 B2

ELECTRONIC DEVICE WITH NETWORK CONNECTION FUNCTIONALITY AND METHOD APPLIED TO THE ELECTRONIC DEVICE

BACKGROUND

1. Technical Field

The disclosure relates to an electronic device with network connection functionality.

2. Description of the Prior Art

Wake-on-LAN (WOL) is an Ethernet computer networking standard that allows an electronic device, being under a sleep mode or a power-off mode, to be woken up from a sleep mode to a normal mode or to be switched from a power-off state into a power-on state via a network message issued by the other side of a local area network (probably an Ethernet).

Generally speaking, when the electronic device is under the power-off state (or the sleep mode), the network system within the electronic device is still powered by a power supply. The power supply can maintain the minimum operating capacity of the network system, such that the network system can listen to network broadcast information from the outside of the electronic device, and perform detections and interpretations upon contents of the information. When a designated information content is found in the contents of the network broadcast information, a determination may be performed upon the packet. Once the address within the contents of the packet is consistent with the address of the electronic device, a power-on procedure (or a wake-up procedure) will be launched by notifying circuit components (such as, the PCB or the power supply) of the electronic device through the network system.

Hence, how to preserve the wake-on-LAN function and save the power consumption of the network system become important topics in this field.

BRIEF SUMMARY

It is therefore one of the objectives of the disclosure to provide an electronic device with network connection functionality and a method applied to such electronic device to solve the abovementioned problems.

In an exemplary embodiment, an electronic device with network connection functionality is provided. The electronic device may include a transceiver chip and a processing circuit. The transceiver chip is arranged for processing a data corresponding to a physical (PHY) layer. The processing circuit is externally connected to the transceiver chip, and is arranged for processing a data corresponding to a media access control (MAC) layer. When the transceiver chip receives a designated packet, the transceiver chip generates a notification signal to notify at least one portion of the processing circuit to be switched from a first operating mode to a second operating mode.

In another exemplary embodiment, a method applied to an electronic device with network connection functionality is provided. The method includes the following steps: utilizing a transceiver chip to processing a data corresponding to a physical (PHY) layer; utilizing a processing circuit, externally connected to the transceiver chip, to process at least a data corresponding to a media access control (MAC) layer; and wherein when the transceiver chip receives a designated packet, generating a notification signal to notify at least one portion of the processing circuit to be switched from a first operating mode to a second operating mode.

An electronic device with network connection functionality and a method applied to such electronic device are provided in the disclosure. When the transceiver chip receives a designated packet, the transceiver chip can be utilized for generating a notification signal to notify at least one portion of the processing circuit to be switched from a first operating mode to a second operating mode. As a result, not only the system can be woken up through a single PHY layer chip, but also the MAC layer can enter a sleep mode in order to achieve an optimum power-saving mechanism. In addition, if the transceiver chip generates the notification signal to notify the MAC layer to be switched from the sleep mode to the normal mode when the designated packet is received, the data lost won't be occurred in the MAC layer. In short, only the transceiver chip needs to work normally to keep connection alive with a network system, while the other circuits can enter the sleep mode so as to achieve an optimum power-saving mechanism.

These and other objectives of the disclosure will no doubt become obvious to those of ordinary skill in the art after reading the following detailed description of the embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
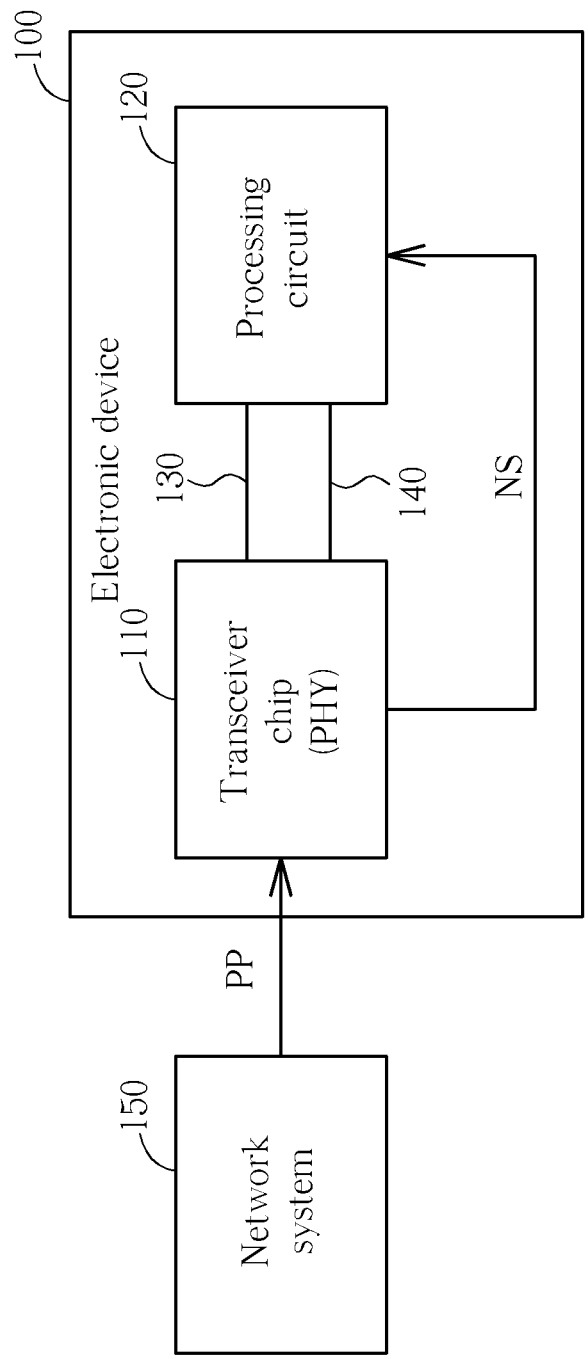
FIG. 1 is a block diagram illustrating an electronic device with network connection functionality according to a first embodiment of the disclosure.

Please refer to FIG. 1. FIG. 1 is a block diagram illustrating an electronic device 100 with network connection functionality according to a first embodiment of the disclosure. As shown in FIG. 1, the electronic device 100 may include, but is not limited to, a transceiver chip 110 and a processing circuit 120. The transceiver chip 110 is arranged for processing a data corresponding to a physical (PHY) layer. The processing circuit 120 is externally connected to the transceiver chip 110, and is arranged for processing at least a data corresponding to a media access control (MAC) layer. That is to say, in this embodiment, the transceiver chip 110 may be a single PHY chip, which does not have a function of processing the data corresponding to a MAC layer. Therefore, when the transceiver chip 110 receives a designated packet PP, the transceiver chip 110 may generate a notification signal NS to notify at least one portion of the processing circuit 120 to be switched from a first operating mode to a second operating mode. Please note that, in this embodiment, the transceiver chip 110 utilizes a signal edge or a signal width of the notification signal NS to notify the at least one portion of the processing circuit 120 to be switched from the first operating mode to the second operating mode, but this in no way should be considered as a limitation of the disclosure. Moreover, the first operating mode may be a sleep mode, and the second operating mode may be a normal mode, and the notification signal NS may be a wake-up notification signal. However, this is presented merely to illustrate practicable designs of the disclosure, and in no way should be considered to be limitations of the scope of the disclosure. For example, in other embodiments, the first operating mode may be a normal mode, the second operating mode may be a sleep mode, and the notification signal NS may be a sleep notification signal, which also belongs to the scope of the disclosure.

For example, when the processing circuit 120 of the electronic device 100 enters the sleep mode, the transceiver chip 110 still keeps connection alive with a network system 150. If the network system 150 desires to make a connection with the electronic device 100, the network system 150 may send out a designated packet PP, such as a magic packet or a wake-up frame packet, but the disclosure is not limited to this only. When the transceiver chip 110 receives the designated packet PP, the transceiver chip 110 then generates a notification signal NS to directly notify the at least one portion of the processing circuit 120 to be switched from the sleep mode to the normal mode.

The abovementioned magic packet may be a broadcasting frame. In a magic packet, a data with six consecutive "FF" (i.e., "FFFFFFFFFFFF") in hexadecimal is included, wherein each "FF" in hexadecimal can be converted into a binary data of 11111111. After that data with six consecutive "FF", an address information corresponding to the MAC layer is followed, sometimes a password with 4 bytes or 6 bytes is further followed. Once the transceiver chip 110 appreciates that the MAC address information and password within the content of the magic packet is consistent with the address information and password of the electronic device 100 through detections, interpretations, and determinations of the transceiver chip 110, the wake-up procedure will be launched. Details of the wake-up frame packet are already well known to those skilled in the art, and further description is omitted here for brevity.

Please keep referring to FIG. 1. As shown, the electronic device 100 further includes a first interface 130 and a second interface 140. The first interface 130 is connected between the transceiver chip 110 and the processing circuit 120. When the at least one portion of the processing circuit 120 is switched from the sleep mode to the normal mode, the processing circuit 120 notifies the transceiver chip 110 that the at least one portion of the processing circuit 120 enters the normal mode via the first face 130. The second interface 140 is connected between the transceiver chip 110 and the processing circuit 120. When the at least one portion of the processing circuit 120 is under the sleep mode, the processing circuit 120 controls the second interface 140 to send data or receive data. In other words, under the sleep mode, the second interface 140 can be set as enabled or disabled. Furthermore, when the at least one portion of the processing circuit 120 is switched from the sleep mode to the normal mode, the processing circuit 120 can control the second interface 120 to send data via the first interface 130.

Please note that, the first interface 130 may include a management data control (MDC) clock and a management data input/output MDIO, which are already well known to those skilled in the art and further descriptions are omitted here for brevity. In addition, the second interface 140 may be a media independent interface (MII) or a reverse media independent interface (RMII), but the disclosure is not limited to this only. Please also note that, the media independent interface may include an output clock (TX_CLK), an input clock (RX_CLK), an output data (TX[0:3]), an input data (RX[0:3]), enable signals for notifying the other side to send data or receive data (TX_EN and RX_EN), error notification signals of output data and input data (TX_ER and RX_ER), a notification signal for deriving valid input data (RX_DV), a network congestion signal (COL), and a response signal CRS. What's more, as the name implies, the reverse media independent interface is a scaled-down version of the media independent interface, wherein the reverse media independent interface reduces some pins. For example, each of the output data TX [0:1] and input data RX [0:1] of the reverse media independent interface is defined by using two bits only, and the input clock RX_CLK is omitted. Since, details of the media independent interface and the reverse media independent interface are already well known to those skilled in the art, further description is omitted here for brevity.

Figure 2:
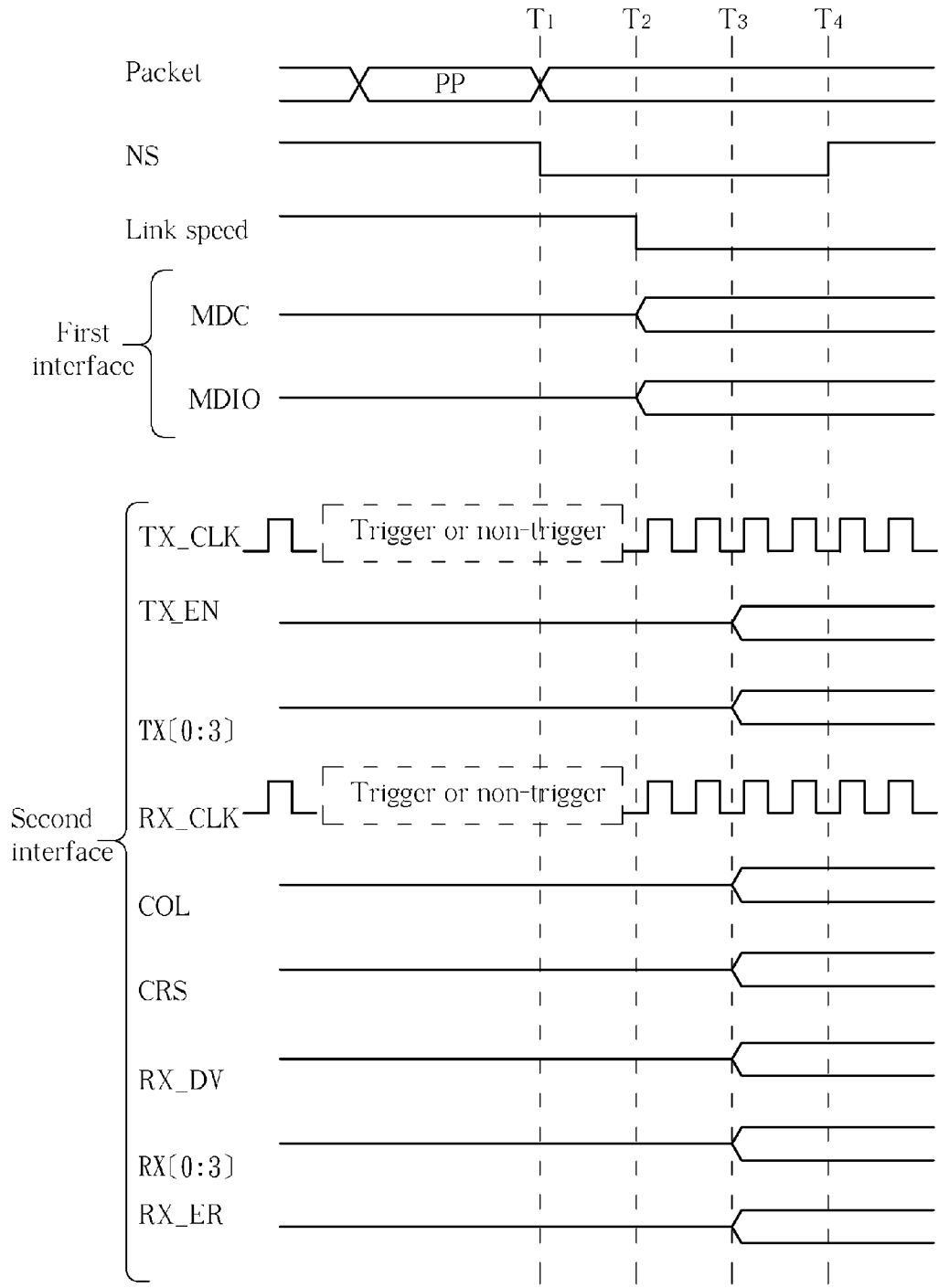
FIG. 2 is a diagram illustrating how the electronic device shown in FIG. 1 switches operating modes according to a first embodiment of the disclosure.

Please refer to FIG. 2. FIG. 2 is a diagram illustrating how the electronic device 100 shown in FIG. 1 switches operating modes according to a first embodiment of the disclosure. Please note that, in this embodiment, active low is cited for illustration, but the scope of the disclosure is not limited to this embodiment. What calls for special attention is that: in this embodiment, the second interface 140 is implemented by using a media independent interface as an example. As shown in FIG. 2, during the timing T1, after the transceiver chip 110 receives the designated packet PP (such as, a magic packet or a wake-up frame packet), the transceiver chip 110 generates a notification signal NS to directly notify the processing circuit 120 to be switched from the sleep mode to the normal mode. During the timing T2, the processing circuit 120 notifies the transceiver chip 110 that the at least one portion of the processing circuit 120 enters the normal mode via the first face 130, and notifies the transceiver chip 110 to set the link speed as high speed. For example, the link speed is switched from 10 Mbps to 100 Mbps. At this time, the first interface 130 enters the normal mode, and the transmitting unit of the second interface 140 enters the normal mode as well. During the timing T3, the receiving unit of the second interface 140 enters the normal mode. Until the timing T4, the processing circuit 120 has already been reset so as to enter the normal mode.

Please note that, during the timing T2 in this embodiment, some functions of the second interface 140 can be disabled or enabled. For example, the output clock TX_CLK can be set as trigger or non-trigger, the input clock RX_CLK can be set as trigger or non-trigger, the output data TX[0:3], the input data RX[0:3], the enable signal for output data TX_EN, enable signal for input data RX_EN, the error notification signal of input data RX_ER, the notification signal for deriving valid input data RX_DV, the network congestion signal COL, and the response signal CRS can be set as non-trigger.

Figure 3:
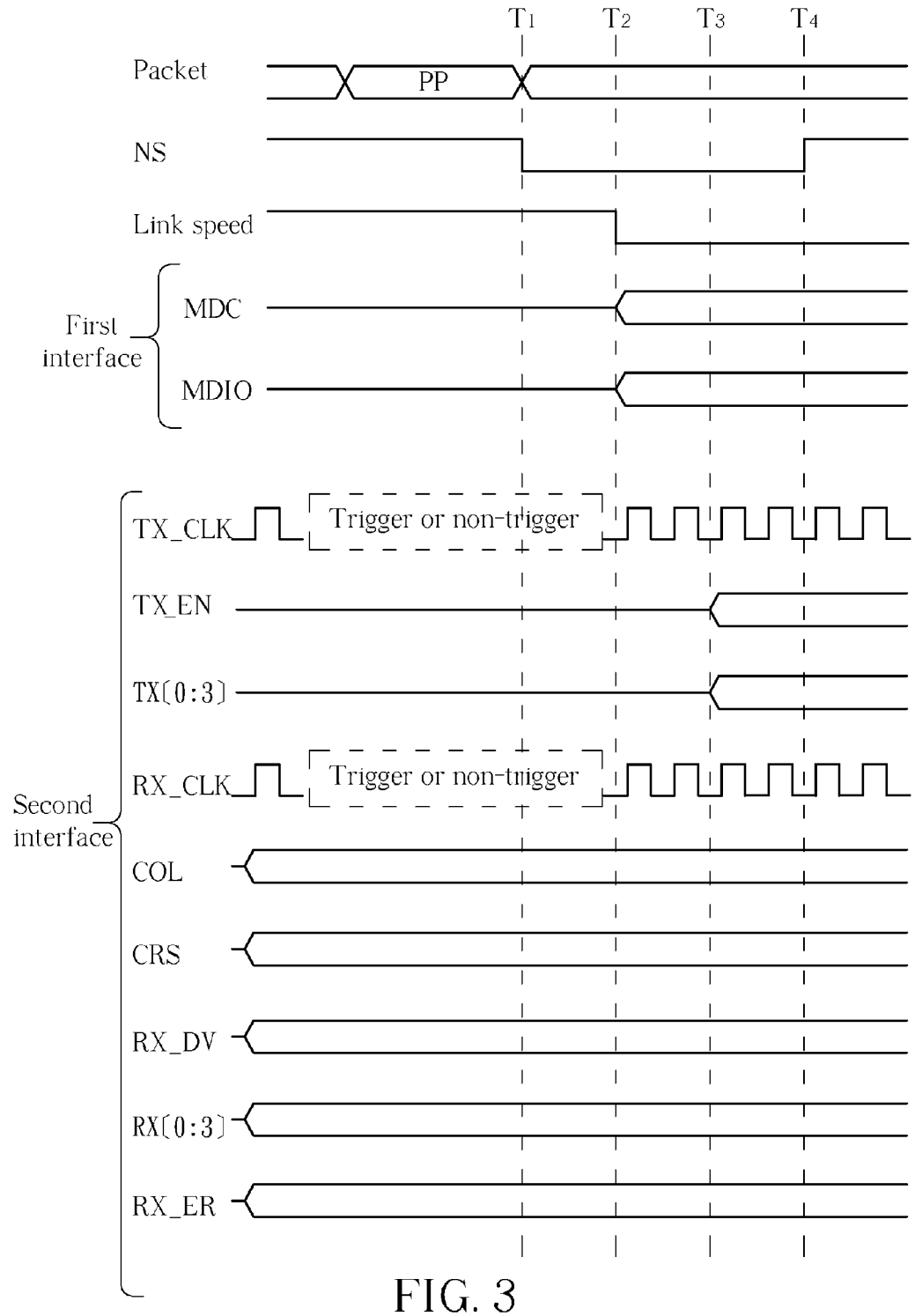
FIG. 3 is a diagram illustrating how the electronic device shown in FIG. 1 switches operating modes according to a second embodiment of the disclosure.
Figure 4:
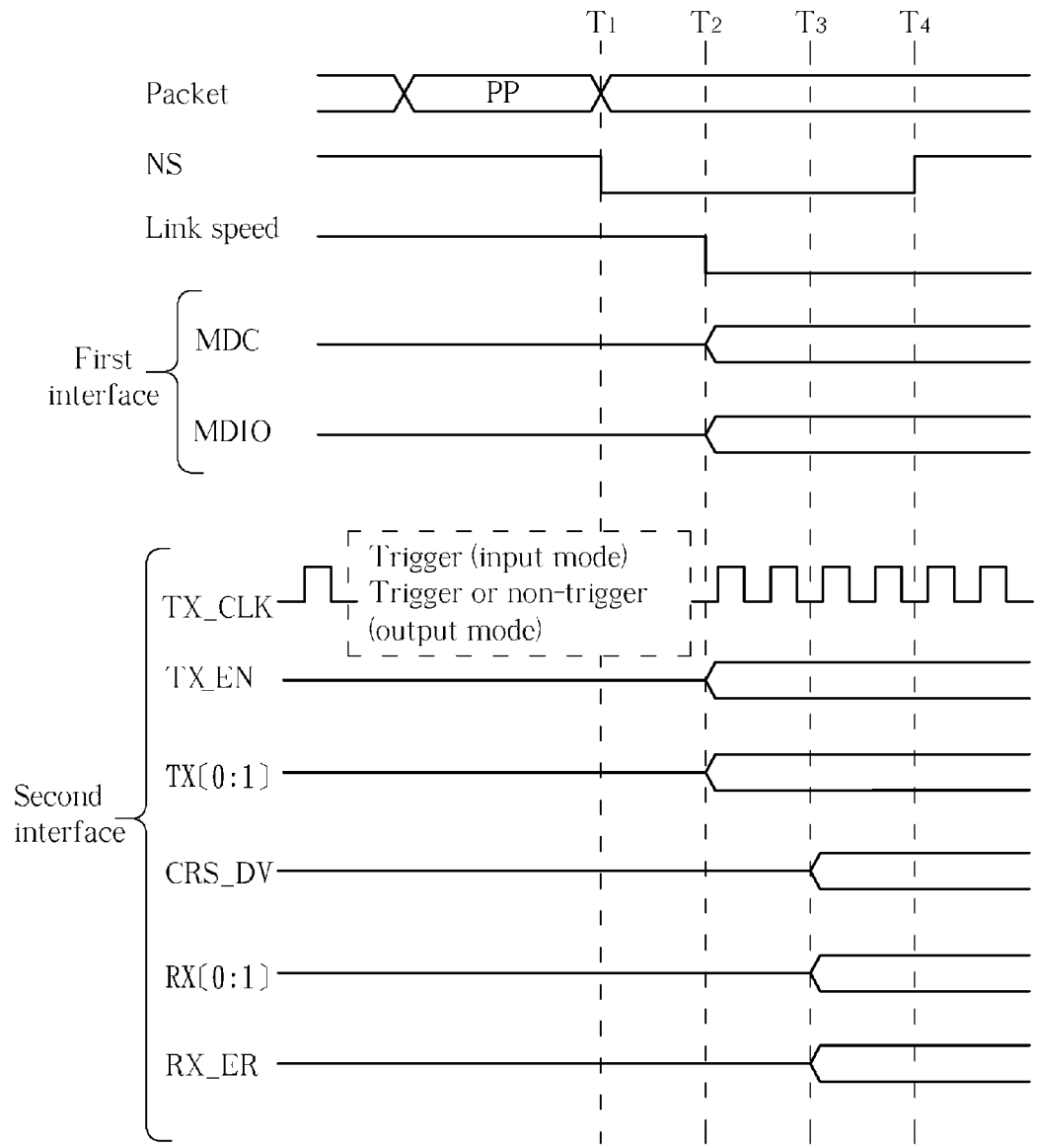
FIG. 4 is a diagram illustrating how the electronic device shown in FIG. 1 switches operating modes according to a third embodiment of the disclosure.

Please refer to FIG. 3. FIG. 3 is a diagram illustrating how the electronic device 100 shown in FIG. 1 switches operating modes according to a second embodiment of the disclosure. The mode-switching mechanism shown in FIG. 3 is similar to the mode-switching mechanism shown in FIG. 2, and the major difference between them is that: the output data TX[0:3], the input data RX[0:3], the enable signal for output data TX_EN, enable signal for input data RX_EN, the error notification signal of input data RX_ER, the notification signal for deriving valid input data RX_DV, the network congestion signal COL, and the response signal CRS are set as trigger Please refer to FIG. 4. FIG. 4 is a diagram illustrating how the electronic device 100 shown in FIG. 1 switches operating modes according to a third embodiment of the disclosure. The mode-switching mechanism shown in FIG. 4 is similar to the mode-switching mechanism shown in FIG. 2, and the major difference between them is that: the second interface shown in FIG. 4 is implemented by using a reverse media independent interface (RMII). In this embodiment, if the output clock TX_CLK is transmitted from the processing circuit 120 to the transceiver chip 110 (i.e., the input mode), the output clock TX_CLK must be set as trigger; if the output clock TX_CLK is transmitted from the transceiver chip 110 to the processing circuit 120 (i.e., the output mode), the output clock TX_CLK can be set as trigger or non-trigger. Please note that, in this embodiment, the output data TX[0:1], the input data RX[0:1], the enable signal for output data TX_EN, the error notification signal of input data RX_ER, and the response signal CRS_DV care set as non-trigger.

Figure 5:
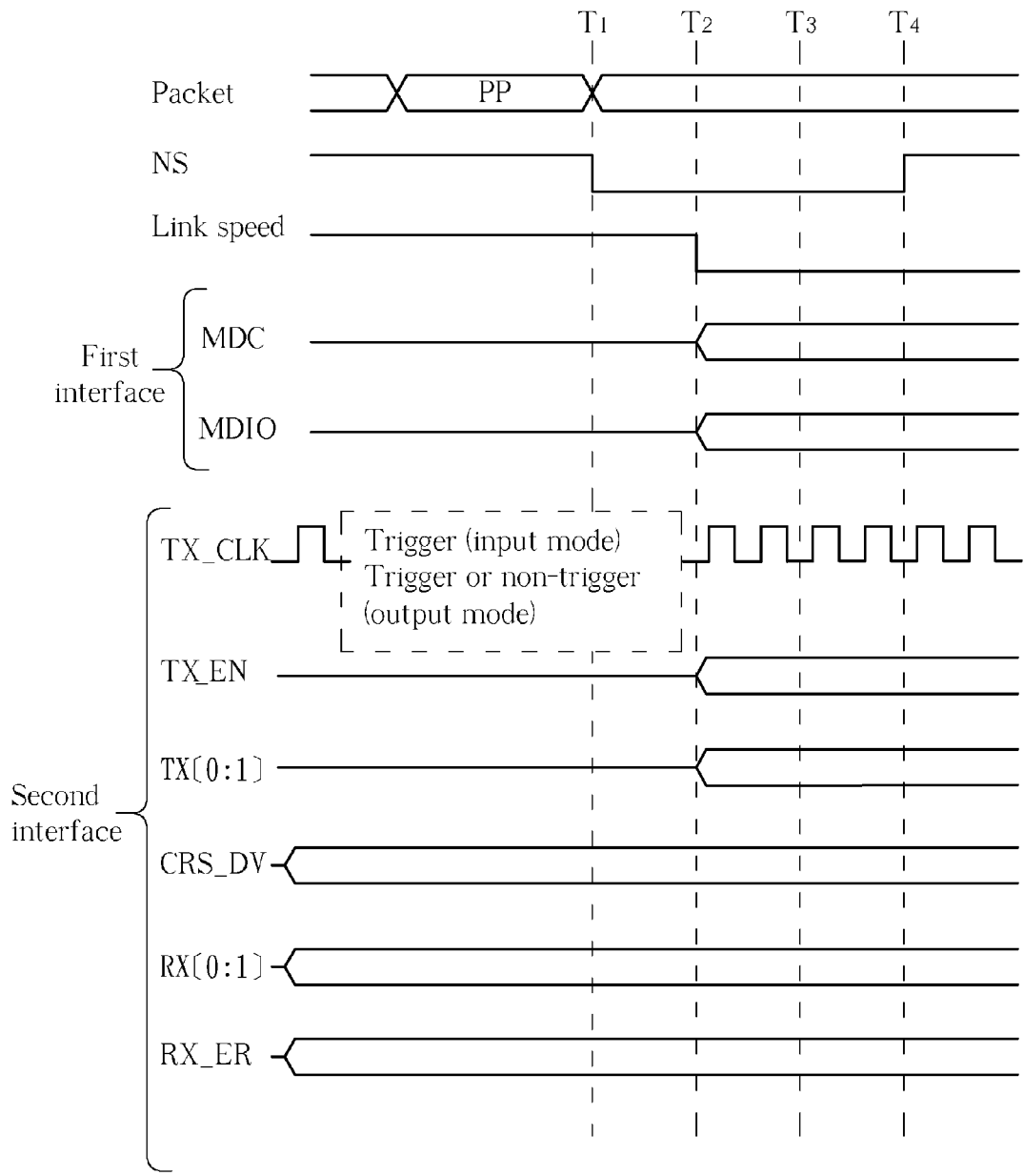
FIG. 5 is a diagram illustrating how the electronic device shown in FIG. 1 switches operating modes according to a fourth embodiment of the disclosure.

Please refer to FIG. 5. FIG. 5 is a diagram illustrating how the electronic device 100 shown in FIG. 1 switches operating modes according to a fourth embodiment of the disclosure. The mode-switching mechanism shown in FIG. 5 is similar to the mode-switching mechanism shown in FIG. 3, and the major difference between them is that: the output clock TX_CLK shown in FIG. 5 can be set as trigger or non-trigger. Please note that, in this embodiment, the output data TX[0:1], the input data RX [0:1], the enable signal for output data TX_EN, the error notification signal of input data RX_ER, and the response signal CRS_DV care set as trigger.

Figure 6:
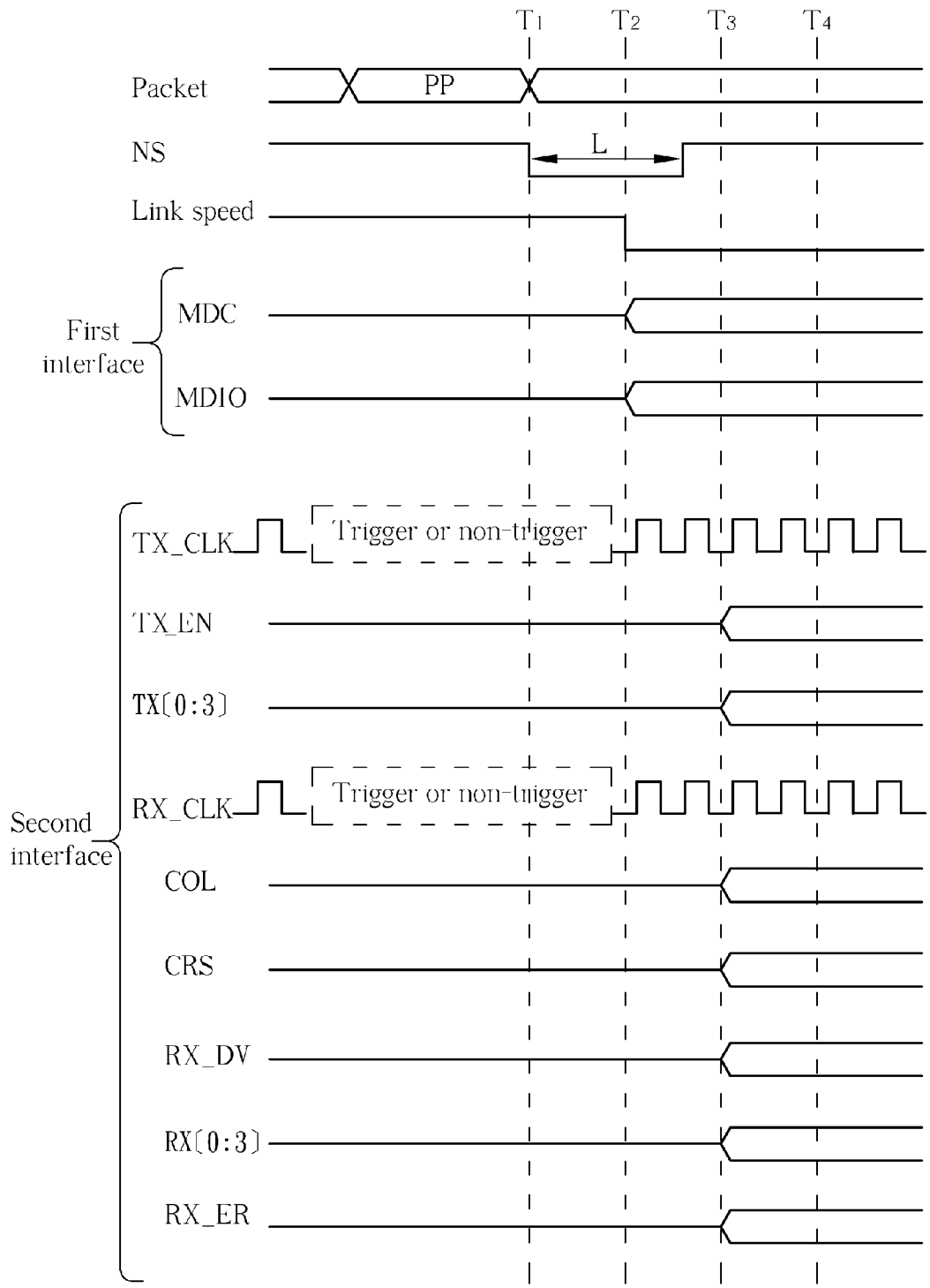
FIG. 6 is a diagram illustrating how the electronic device shown in FIG. 1 switches operating modes according to a fifth embodiment of disclosure.

Please refer to FIG. 6. FIG. 6 is a diagram illustrating how the electronic device 100 shown in FIG. 1 switches operating modes according to a fifth embodiment of the disclosure. The mode-switching mechanism shown in FIG. 6 is similar to the mode-switching mechanism shown in FIG. 2, and the major difference between them is that: in FIG. 2, a signal edge of the notification signal NS is utilized for notifying the at least one portion of the processing circuit 120 to be switched from the first operating mode to the second operating mode; however, in FIG. 6, a signal width L of the notification signal is utilized for notifying the at least one portion of the processing circuit 120 to be switched from the first operating mode to the second operating mode.

As can be known from above, the operations of the second interface 140 can be flexibly set through the processing circuit 120 disclosed in the disclosure. Moreover, the abovementioned embodiments are presented merely to illustrate practicable designs of the disclosure, and should be considered to be limitations of the scope of the disclosure. Undoubtedly, those skilled in the art should appreciate that: the features of utilizing a signal edge of the notification signal NS for notifying the at least one portion of the processing circuit 120 to be switched from the first operating mode to the second operating mode described in FIG. 3, FIG. 4 or FIG. 5 can be replaced by the features of utilizing a signal width L of the notification signal for notifying the at least one portion of the processing circuit 120 to be switched from the first operating mode to the second operating mode described in FIG. 6, which also belongs to the scope of the disclosure.

Figure 7:
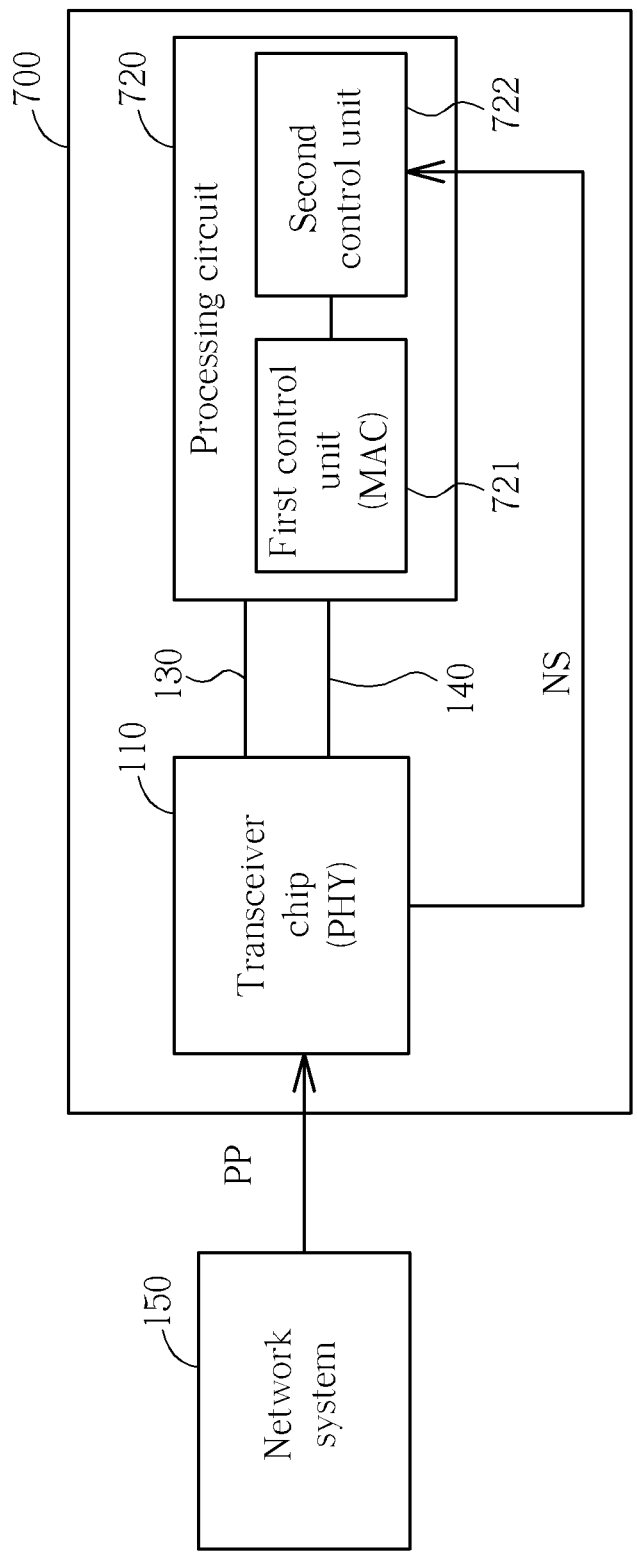
FIG. 7 is a block diagram illustrating an electronic device with network connection functionality according to a second embodiment of the disclosure.

Please refer to FIG. 7. FIG. 7 is a block diagram illustrating an electronic device 700 with network connection functionality according to a second embodiment of the disclosure. The architecture of the electronic device 700 shown in FIG. 7 is similar to that of the electronic device 100 shown in FIG. 1, and the major difference between them is that: a processing circuit 720 of the electronic device 700 shown in FIG. 7 includes a first control unit 721 and a second control unit 722. The first control unit 721 is arranged for processing the data corresponding to the MAC layer, and the second control unit 722 is arranged for controlling operations of the electronic device 700. What calls for special attention is that: when the transceiver chip 110 receives the designated packet PP (such as, a magic packet or a wake-up frame packet), the transceiver chip 110 generates the notification signal NS to directly notify the second control unit 722 to be switched from the first operating mode to the second operating mode.

Figure 8:
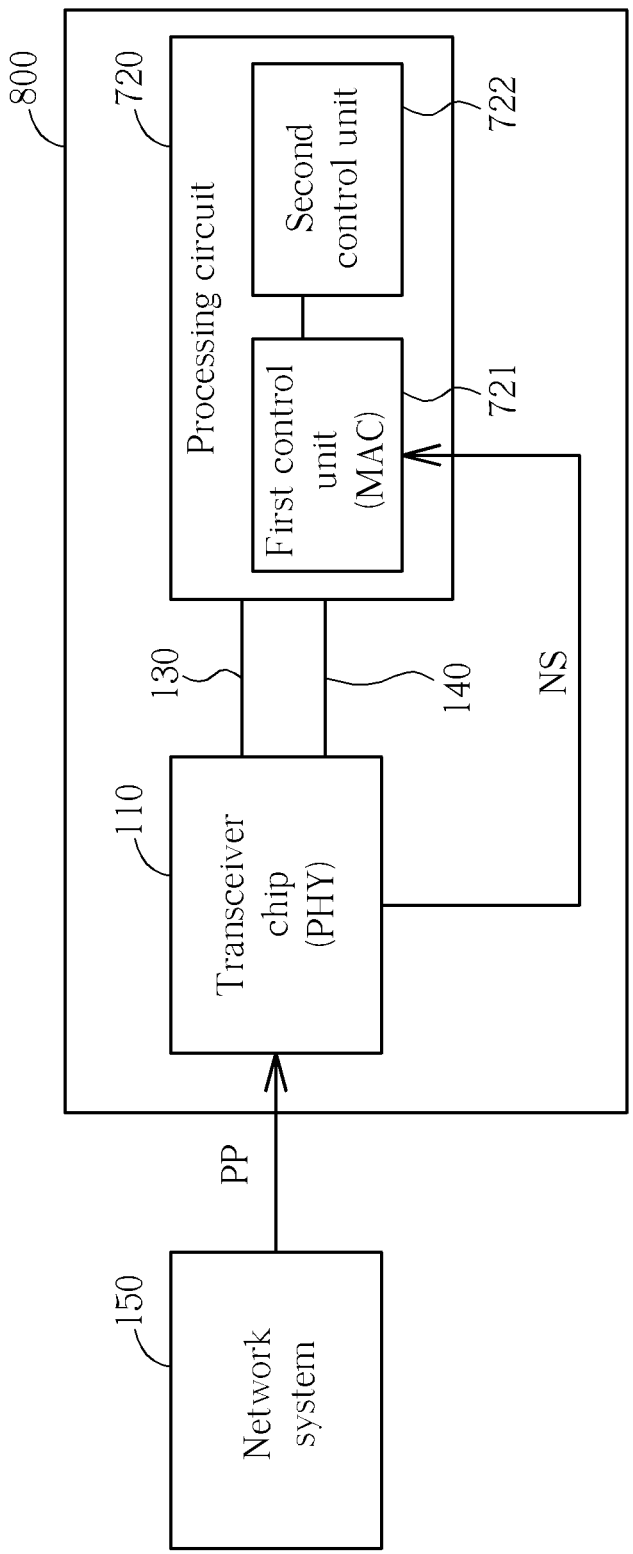
FIG. 8 is a block diagram illustrating an electronic device with network connection functionality according to a third embodiment of the disclosure.

Please refer to FIG. 8. FIG. 8 is a block diagram illustrating an electronic device 100 with network connection functionality according to a third embodiment of the disclosure. The architecture of the electronic device 800 shown in FIG. 8 is similar to that of the electronic device 700 shown in FIG. 7, and the major difference between them is that: the transceiver chip 110 of the electronic device 800 shown in FIG. 8 generates the notification signal NS to notify the first control unit 721 in order to utilize the first control unit 721 to notify the second control unit 722 to be switched from the first operating mode to the second operating mode.

Figure 9:
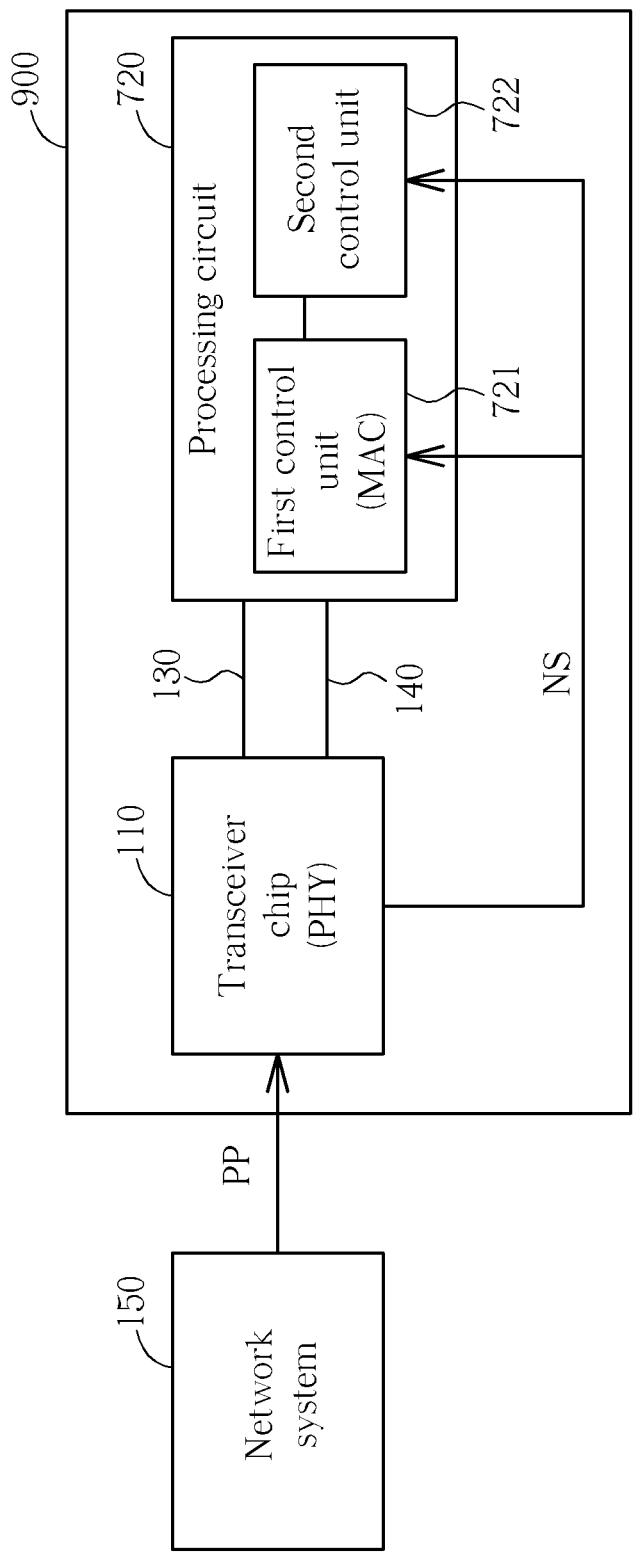
FIG. 9 is a block diagram illustrating an electronic device with network connection functionality according to a fourth embodiment of the disclosure.

Please refer to FIG. 9. FIG. 9 is a block diagram illustrating an electronic device 900 with network connection functionality according to a fourth embodiment of the disclosure. The architecture of the electronic device 900 shown in FIG. 9 is similar to that of the electronic device 700 shown in FIG. 7, and the major difference between them is that: the transceiver chip 110 of the electronic device 900 shown in FIG. 9 generates the notification signal NS to simultaneously notify the first control unit 721 and the second control unit 722 to be switched from the first operating mode to the second operating mode.

Figure 10:
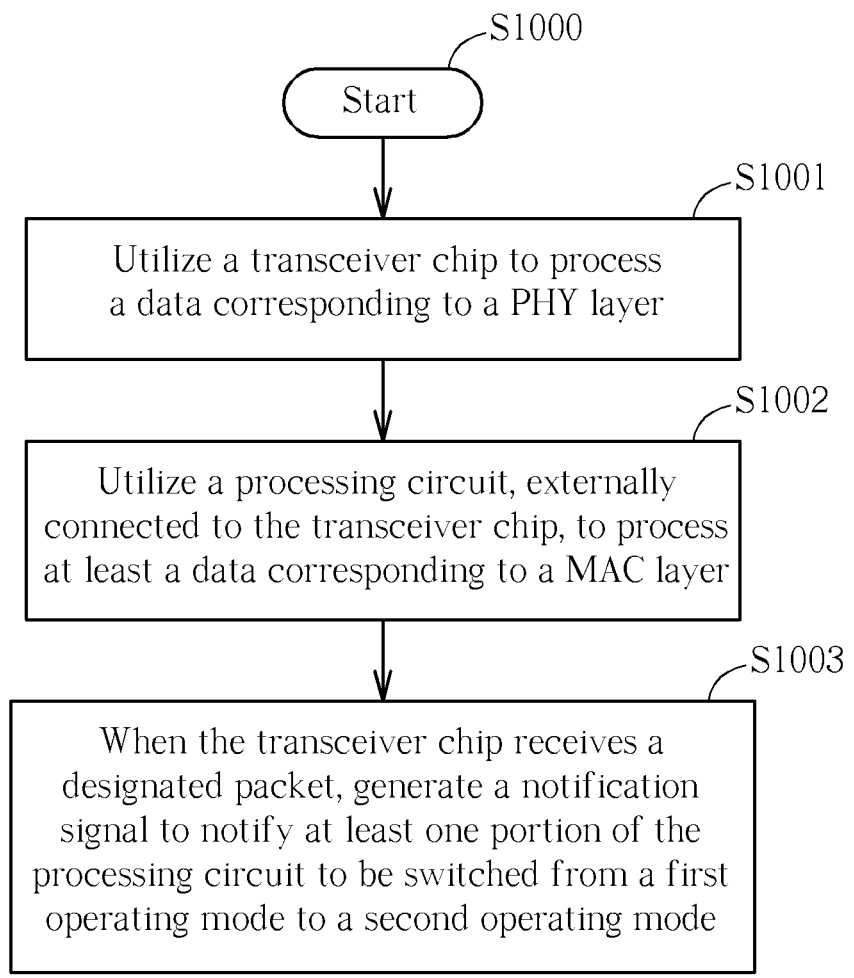
FIG. 10 is a flowchart illustrating a method applied to an electronic device with network connection functionality according to an exemplary embodiment of the disclosure.

Please refer to FIG. 10. FIG. 10 is a flowchart illustrating a method applied to an electronic device with network connection functionality according to an exemplary embodiment of the disclosure. Please note that the following steps are not limited to be performed according to the exact sequence shown in FIG. 10 if a roughly identical result can be obtained. The method includes, but is not limited to, the following steps:

Step S1000: Start.

Step S1001: Utilize a transceiver chip to process a data corresponding to a PHY layer.

Step S1002: Utilize a processing circuit, externally connected to the transceiver chip, to process at least a data corresponding to a MAC layer.

Step S1003: When the transceiver chip receives a designated packet, generate a notification signal to notify at least one portion of the processing circuit to be switched from a first operating mode to a second operating mode.

How each element operates can be known by collocating the steps shown in FIG. 10 and the elements shown in FIG. 1, FIG. 7, FIG. 8 or FIG. 9, and further description is omitted here for brevity. What calls for special attention is that: the at least one portion of the processing circuit 120 may include the first control unit 721 and/or the second control unit 722.

Please note that, the steps of the abovementioned flowcharts are merely practicable embodiments of the disclosure, and in no way should be considered to be limitations of the scope of the disclosure. These methods can include other intermediate steps or several steps can be merged into a single step without departing from the spirit of the disclosure.

The abovementioned embodiments are presented merely to illustrate practicable designs of the disclosure, and should be considered to be limitations of the scope of the disclosure. In summary, an electronic device with network connection functionality and a method applied to such electronic device are provided. When the transceiver chip receives a designated packet, the transceiver chip can be utilized for generating a notification signal to notify at least one portion of the processing circuit 120 (such as, the first control unit and/or the second control unit) to be switched from a first operating mode to a second operating mode. As a result, the system can be woken up through the transceiver chip. In addition, the first control unit can enter the sleep mode in order to achieve a better power-saving mechanism. What's more, if the transceiver chip generates the notification signal to notify the first control unit to be switched from the sleep mode to the normal mode when the designated packet is received, the data lost won't be occurred in the first control unit. In one word, only the transceiver chip needs to work normally to keep connection alive with a network system, while the other circuits can enter the sleep mode so as to achieve an optimum power-saving mechanism.

Those skilled in the art will readily observe that numerous modifications and alterations of the device and method may be made while retaining the teachings of the disclosure.

What is claimed is:

1. An electronic device with network connection functionality, comprising:
   a transceiver chip, arranged for processing a data corresponding to a physical (PHY) layer;
   a processing circuit, externally connected to the transceiver chip, arranged for processing at least a data corresponding to a media access control (MAC) layer, wherein the MAC layer and the PHY layer correspond to data transmission over a same transmission medium; and
   a first interface, connected between the transceiver chip and the processing circuit,
   wherein when the transceiver chip receives a designated packet, the transceiver chip generates a notification signal to notify at least one portion of the processing circuit to be switched from a first operating mode to a second operating mode,
   wherein when the at least one portion of the processing circuit is switched from the first operating mode to the second operating mode, the processing circuit notifies the transceiver chip that the at least one portion of the processing circuit enters the second operating mode via the first interface.

2. The electronic device of claim 1, wherein the processing circuit comprises:
   a first control unit, arranged for processing the data corresponding to the MAC layer; and
   a second control unit, arranged for controlling operations of the electronic device;
   wherein the transceiver chip generates the notification signal to directly notify the second control unit to be switched from the first operating mode to the second operating mode.

3. The electronic device of claim 1, wherein the processing circuit comprises:
   a first control unit, arranged for processing the data corresponding to the MAC layer; and
   a second control unit, arranged for controlling operations of the electronic device;
   wherein the transceiver chip generates the notification signal to notify the first control unit in order to utilize the first control unit to notify the second control unit to be switched from the first operating mode to the second operating mode.

4. The electronic device of claim 1, wherein the processing circuit comprises:
   a first control unit, arranged for processing the data corresponding to the MAC layer; and
   a second control unit, arranged for controlling operations of the electronic device;
   wherein the transceiver chip generates the notification signal to simultaneously notify the first control unit and the second control unit to be switched from the first operating mode to the second operating mode.

5. The electronic device of claim 1, wherein the notification signal is a wake-up notification signal, the first operating mode is a sleep mode, and the second operating mode is a normal mode.

6. The electronic device of claim 5, further comprising:
   a second interface, connected between the transceiver chip and the processing circuit;
   wherein when the at least one portion of the processing circuit is under the sleep mode, the processing circuit sets the second interface to send data or receive data.

7. The electronic device of claim 6, wherein when the at least one portion of the processing circuit is switched from the sleep mode to the normal mode, the processing circuit controls the second interface to start sending data via the first interface.

8. The electronic device of claim 6, wherein when the at least one portion of the processing circuit is switched from the sleep mode to the normal mode, the processing circuit sets a link speed of the transceiver chip via the first interface.

9. The electronic device of claim 6, wherein the second interface is a media independent interface (MII) or a reverse media independent interface (RMII).

10. The electronic device of claim 5, wherein the designated packet conforms to a magic packet format or a wake-up frame packet format.

11. The electronic device of claim 1, wherein the transceiver chip utilizes a signal edge or a signal width of the notification signal to notify the at least one portion of the processing circuit to be switched from the first operating mode to the second operating mode.

12. A method applied to an electronic device with network connection functionality, comprising:
   utilizing a transceiver chip to process a data corresponding to a physical (PHY) layer;
   utilizing a processing circuit, externally connected to the transceiver chip, to process at least a data corresponding to a media access control (MAC) layer, wherein the MAC layer and the PHY layer correspond to data transmission over a same transmission medium; and wherein when the transceiver chip receives a designated packet, utilizing the transceiver chip to generate a notification signal to notify at least one portion of the processing circuit to be switched from a first operating mode to a second operating mode, wherein when the at least one portion of the processing circuit is switched from the first operating mode to the second operating mode, utilizing the processing circuit to notify the transceiver chip that the at least one portion of the processing circuit enters the second operating mode via a first interface connected between the transceiver chip and the processing circuit.

13. The method of claim 12, wherein the notification signal is a wake-up notification signal, the first operating mode is a sleep mode, and the second operating mode is a normal mode.

14. The method of claim 13, further comprising:
when the at least one portion of the processing circuit is switched from the sleep mode to the normal mode, notifying the transceiver chip that the at least one portion of the processing circuit enters the normal mode via the first interface.

15. The method of claim 14, further comprising:
connecting a second interface between the transceiver chip and the processing circuit; and
when the at least one portion of the processing circuit is under the sleep mode, setting the second interface to send data or receive data.

16. The method of claim 15, further comprising:
when the at least one portion of the processing circuit is switched from the sleep mode to the normal mode, controlling the second interface to start sending data.

17. The method of claim 15, further comprising:
when the at least one portion of the processing circuit is switched from the sleep mode to the normal mode, setting a link speed of the transceiver chip.

18. The method of claim 12, wherein the step of generating the notification signal to notify the at least one portion of the processing circuit to be switched from the first operating mode to the second operating mode comprises:
utilizes a signal edge or a signal width of the notification signal to notify the at least one portion of the processing circuit to be switched from the first operating mode to the second operating mode.

19. An electronic device with network connection functionality, comprising:
a transceiver chip, arranged for processing a data corresponding to a physical (PHY) layer;
a processing circuit, externally connected to the transceiver chip, arranged for processing at least a data corresponding to a media access control (MAC) layer, wherein the MAC layer and the PHY layer correspond to data transmission over a same transmission medium;
first and second interfaces connected between the transceiver chip and the processing circuit;
wherein when the transceiver chip receives a designated packet, the transceiver chip generates a notification signal to notify at least one portion of the processing circuit to be switched from a first operating mode to a second operating mode,
wherein when the at least one portion of the processing circuit is switched from the first operating mode to the second operating mode, the processing circuit controls the second interface to start sending data via the first interface.

* * * * *